(12) United States Patent
Martinie et al.

(10) Patent No.: US 7,713,399 B2
(45) Date of Patent: May 11, 2010

(54) PROCESS FOR TREATING A SULFUR-CONTAINING SPENT CAUSTIC REFINERY STREAM USING A MEMBRANE ELECTROLYZER POWERED BY A FUEL CELL

(75) Inventors: Gary Dean Martinie, Dhahran (SA); Fahran M. Al-Shahrani, Dhahran (SA); Bashir O. Dabbousi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1193 days.

(21) Appl. No.: 11/128,857

(22) Filed: May 12, 2005

(65) Prior Publication Data
US 2006/0254930 A1 Nov. 16, 2006

(51) Int. Cl.
*C25B 1/26* (2006.01)
(52) U.S. Cl. .......................... 205/343; 205/536
(58) Field of Classification Search ............... 205/536, 205/343
See application file for complete search history.

(56) References Cited

U.S. PATENT DOCUMENTS

| | | | |
|---|---|---|---|
| 2,654,706 A | | 10/1953 | Gaylor |
| 2,859,177 A | | 11/1958 | Rippie et al. |
| 4,054,419 A | * | 10/1977 | Smith et al. .................. 422/211 |
| 4,323,437 A | * | 4/1982 | Mucenieks .................. 205/536 |
| 4,488,949 A | * | 12/1984 | Lee et al. ..................... 205/536 |
| 4,647,351 A | * | 3/1987 | Gelb .......................... 205/343 |
| 5,268,104 A | | 12/1993 | Masoomain |
| 5,589,053 A | | 12/1996 | Moran et al. |
| 5,667,668 A | | 9/1997 | Moral et al. |
| 5,667,760 A | | 9/1997 | Sweeney |

(Continued)

FOREIGN PATENT DOCUMENTS

EP 0 509 964 A1 10/1992

(Continued)

OTHER PUBLICATIONS

International Preliminary Report on Patentability, PCT/US06/18896, dated Aug. 2, 2008 (pp. 1-8).

(Continued)

*Primary Examiner*—Arun S Phasge
(74) *Attorney, Agent, or Firm*—Abelman, Frayne & Schwab

(57) ABSTRACT

A continuous method for the treatment of a spent aqueous caustic stream used to scrub a hydrocarbon process stream to remove oxidizable sulfur-containing compounds includes:
  a. mixing an oxidizing hypochlorous acid stream produced from an aqueous brine solution with the aqueous caustic stream to form a reactive mixed feedstream;
  b. contacting the reactive mixed feedstream with at least one catalyst to promote the oxidation of the sulfur-containing compounds and the neutralization of the sodium hydroxide; and
  c. recovering a neutral treated product stream comprising aqueous sodium sulfate, sodium carbonate and sodium chloride that is odorless, non-toxic and environmentally acceptable for discharge into the sea or into a conventional sewage treatment system.

Preferably, the hypochlorous acid is produced by an electrolyzer that also produces a (1) hydrogen stream that is directed to a PEM fuel cell to generate at least a portion of the electrical power requirement of the electrolyzer, and (2) water that is combined with fresh sodium hydroxide from the electrolyzer to form a fresh caustic stream for use in scrubbing the hydrocarbon process stream.

27 Claims, 2 Drawing Sheets

U.S. PATENT DOCUMENTS

| | | |
|---|---|---|
| 5,772,897 A | 6/1998 | Hancock |
| 6,132,590 A | 10/2000 | Moran et al. |
| 2003/0094421 A1 | 5/2003 | Gargas |
| 2005/0090419 A1 | 4/2005 | Delcomyn et al. |

FOREIGN PATENT DOCUMENTS

| | | |
|---|---|---|
| WO | WO 01/40113 A1 | 6/2001 |

OTHER PUBLICATIONS

Written Opinion of the International Searching Authority, PCT/US06/18896, dated Aug. 31, 2007 (pp. 1-5).

International Search Report, PCT/US06/18896, dated Aug. 31, 2007 (p. 1).

* cited by examiner

PROCESS FOR TREATING A SULFUR-CONTAINING SPENT CAUSTIC REFINERY STREAM USING A MEMBRANE ELECTROLYZER POWERED BY A FUEL CELL

FIELD OF THE INVENTION

This invention relates to methods and apparatus for treating a sulfur-containing spent caustic solution to produce an environmentally acceptable stream for disposal into the sea or a conventional sewage treatment system.

BACKGROUND OF THE INVENTION

Spent caustic streams resulting from the removal of sulfur from petroleum feed streams produced in refineries and gas plants are highly alkaline, odiferous and toxic, and contain sulfidic, phenolic and naphthenic sodium salts. Environmental concerns and legislation dictate that such spent caustic may no longer be disposed of by direct discharge into the sea.

Refinery and gas plant spent caustic is produced in large quantities of up to 150 gallons per hour. This caustic solution contains sulfides, bisulfides, mercaptides, sulfite, sulfate, thiosulfate, phenols, naphthenates, carboxylates, carbonates, bicarbonates, bisulfites, bisulfates, hydroxides, sodium, sulfonic acids, and many other sulfurous and organic and inorganic species. Neutralization of spent caustic with mineral acids releases odiferous hydrogen sulfide, mercaptans, and other toxic and objectionable species. Discharge of spent caustic to surface waters is largely forbidden because of toxicity and alkalinity. Discharge to sewage treatment is usually not possible because of biotoxicity concerns. In some industrialized countries, spent caustic can be sold for the production of various specialty chemicals. In general, disposal of spent caustic is becoming a major problem and operating expense in oil-producing regions of the world where sulfur is present.

Removal of sulfur compounds from gas streams has been of considerable importance in the past and is even more so today due to environmental considerations. Gas effluent from the combustion of organic materials, such as coal, almost always contain sulfur compounds and sulfur removal processes have focused on removing hydrogen sulfide since it has been considered a significant health hazard and because it is corrosive, particularly when water is present. With increasing emphasis on eliminating or minimizing sulfur discharge to the atmosphere, attention is turning to the removal of other sulfur compounds from gas streams.

Numerous natural gas and petroleum oil wells produce what is referred in the industry as "sour gas" containing hydrogen sulfide, mercaptans, sulfides and disulfides in concentrations that make its use unacceptable. Considerable effort has been expended to find effective and cost-efficient means to remove these objectionable sulfur compounds from natural gas.

The removal of sulfur compounds, and particularly chemically-combined sulfur, such as organosulfur compounds, from feedstreams is highly desirable for environmental reasons and in order to prevent potential catalyst deactivation as well as equipment corrosion. This has become of particular concern to the automotive industry as developing countries try to meet gasoline and diesel fuel needs by using deeper high-sulfur petroleum feed stocks without sweetening processes.

Typically, hydrocarbon products contain various amounts of sulfur compounds in the form of, for example, chemically-combined sulfur, such as inorganically combined sulfur and organically combined sulfur, i.e., organosulfur compounds.

The presence of organosulfur compounds in hydrocarbon streams occurs naturally, and as a result of their introduction during conventional processes for producing and treating hydrocarbon products. As previously noted, if chemically-combined sulfur, such as organosulfur compounds, are not removed from the hydrocarbon stream their presence in the resultant hydrocarbon products, including natural gas, paraffins, olefins and aromatics can cause corrosion of processing equipment and, in the case of gasoline and other fuels, of engine parts. Other deleterious effects occur particularly when water is present.

Various industrial processes utilize an aqueous solution of sodium hydroxide, sometimes referred to herein simply as caustic, to wash reaction products or to remove undesirable compounds as a means of purifying desired reaction products. For instance, caustic is used to wash petroleum products in order to remove undesirable compounds from a feed stock prior to polymerization of propene and butene to obtain high octane gasoline blending components. Such polymerization reactions typically take place under high pressure in the presence of a phosphoric acid catalyst and the hydrocarbon feed stock must be free of sulfur to avoid poisoning the catalyst, basic materials which neutralize the catalyst, and oxygen which deleteriously affects the polymerization reaction. Accordingly, the propene and butene feed stock is washed first with caustic to remove mercaptans and subsequently with an amine solution to remove hydrogen sulfide. Subsequently, the feed stock is washed with water to remove the caustic and amine reaction product. The resulting waste water stream accordingly contains caustic, amines and mercaptans.

In petroleum refining, chemical treatment is used to remove or change the undesirable properties associated with sulfur, nitrogen or oxygen compound contaminants in petroleum feed stocks. The chemical treatment process involves extraction or oxidation, which is also known as sweetening. A prior art extraction process that is used to remove mercaptans from propane/propylene and butane/butylene feed streams is known as the Merox Process. These streams may also undergo treatment with an amine before Merox Process extraction to remove excess hydrogen sulfide that tends to fractionate with propane/propylene and interferes with the Merox process. A caustic prewash removes any remaining trace of hydrogen sulfide prior to the Merox Process extraction. These streams are passed up through the trays of an extraction tower. A caustic solution flowing down the extraction tower absorbs mercaptans. The rich caustic is then regenerated by oxidizing the mercaptans to disulfide in the presence of aqueous Merox Process catalyst and the lean caustic is recirculated to the extraction tower. The disulfide is insoluble in the caustic and can be separated.

Oxidation or "sweetening" is used in the purification of gasoline and distillate fractions. A common oxidation process is also a Merox Process that uses a solid catalyst bed. Air and a minimum amount of the alkaline caustic is injected into the hydrocarbon stream. As the hydrocarbon passes through the Merox Process catalyst bed, sulfur mercaptans are oxidized to disulfide. The disulfide can remain with the gasoline product, since it does not possess the objectionable odor properties of mercaptans. Caustic solutions can also be used to absorb and remove hydrogen sulfide and phenol contaminants from intermediate and final product streams during the refining of petroleum. Aqueous caustic waste streams containing phenols can be recycled by reducing the pH of the aqueous caustic until the phenols become insoluble, thereby allowing physical separation.

Caustic soda and soda ash have been used as an alkaline source in the liquid scrubbing of sulfur dioxide present in gases produced from crude oil-fired steam generators. The use of caustic allows the sulfur dioxide scrubber to run at a lower pH with a higher sulfur dioxide removal capacity when compared to the use of soda ash. Such processes result in a large amount of waste caustic solution which heretofore has been disposed of by flushing into sewers.

As is well known to the prior art, many intermediate and final streams from plants for the processing of petroleum products contain a variety of acid compounds such as hydrogen sulfide, mercaptans, phenols, thiophenols and naphthenic acids that must be removed or reduced in concentration. The compounds containing sulfur must be reduced to concentrations low enough to reduce odor. Aqueous solutions of sodium hydroxide are commonly used in concentrations of between five and fifteen percent by weight to treat petroleum products to obtain the desired reduction in concentration of the undesired components.

Spent caustic soda solutions of the prior art will have different compositions depending upon whether the caustic solution has been used for purification of propane and butane gases or in the purification of petroleum feed stocks obtained from thermal and/or catalytic "cracking" or of "straight-run" hydrocarbons which are obtained by distillation of crude oil at atmospheric pressure. However, in general, the spent caustic soda solutions have pH values ranging from 12.5 to 13.5 and the following compositions expressed in percent by weight: free caustic soda 5.0-7.5; total oils 0.5-2.0; total sulfides 0.1-3.0; cyanides 0.05-0.3; ammonia 0.05-0.4; phenols 0.2-10; lead $2\times10^{-4}$ to $4\times10^{-4}$; arsenic $1\times10^{-4}$ to $5\times10^{-4}$; copper $5\times10^{-4}$ to $50\times10^{-4}$; cadmium $1\times10^{-4}$ to $5\times10^{-4}$; and the balance of the composition being water.

Many processes have been developed to treat spent caustics. Most of these processes are expensive with regard to both capital installation and operating costs.

For example, in U.S. Pat. Nos. 5,589,053 and 5,667,668, an electrolysis process for removal of caustic in a hemicellulose/caustic solution is disclosed. The caustic is recovered by electrolysis in a membrane type electrolytic cell utilizing as an electrolyte a mixture of hemicellulose and caustic which is essentially free of lignin. By electrolysis, the concentration of caustic in the anolyte compartment of the cell is decreased and the concentration of caustic in the cathodic compartment of the cell is increased so as to allow recovery of about 60 to about 80% of the caustic contained in the hemicellulose/caustic starting solution.

Mercaptans have been removed in the prior art from caustic scrubber solutions by blending the caustic with oxidation agents, such as tannic acid, and then blowing air through the spent caustic scrubber solutions to oxidize the mercaptans to disulfides. The disulfides are then either skimmed off as an oily layer or further oxidized to thiosulfate or sulfate using other techniques. The prior art spent caustic scrubber solutions are then either neutralized and sewered or the oxidized sulfur compounds are precipitated with precipitating agents, such as iron, and the precipitate which is formed is removed by filtration leaving the caustic solution filtrate clean enough to be returned to the scrubber. Because of the cost of the precipitation option, current prior art practice mostly employs the neutralization and sewering steps. This process requires large amounts of sulfuric acid which greatly increases the amount of sulfate effluent waste which is discharged from the refinery.

Regeneration of a spent caustic solution used to scrub sour gasoline to remove oxidizable sulfur compounds such as mercaptans, hydrogen sulfides, and other compounds is disclosed in U.S. Pat. No. 2,654,706. The spent caustic solution is electrolyzed in a filter press electrolysis cell having a diaphragm and insoluble electrodes. Following electrolysis, the disulfides produced are separated prior to passing the regenerated caustic back to the scrubbing process. The examples teach the use of electrolytic cell current densities of generally less than 0.2 amps per square inch and cell voltages of about 6 volts or the minimum current density required to oxidize the sulfur containing impurities in the spent caustic solution. Just enough oxygen is generated by electrolysis of the spent caustic solution to oxidize all of the mercaptans present to disulfides. The disulfides are physically separated outside the electrolysis cell in a separation vessel. It is apparent that the process that this patent is intended to replace includes the use of oxidation agents, such as tannic acid, and blowing air into the spent caustic solution to oxidize the mercaptans to disulfides. The process would be a more expensive process than the air oxidation step of the prior art but, more importantly, the disclosure omits mention of the fact that during electrolysis, some of the sulfur compounds are oxidized to thiosulfates or sulfate. These oxidized sulfur compounds will eventually build up in the spent caustic electrolyte to the saturation point so as to require either a sulfate removal step or removal by the use of vacuum crystallization or the neutralizing of the spent caustic solution followed by disposal to the environment of the oxidized spent caustic solution. In this process, the disulfides produced during electrolysis of the spent caustic solution are removed to the environment without further oxidation. Under present or contemplated governmental restrictions, disposal of these disulfides may represent an environmental liability, thus requiring destruction prior to discharge to the environment.

In U.S. Pat. No. 6,132,590, a process is taught for the use of an electrolysis cell operating at about 5 to 10 times the current density and at about half the voltage disclosed in U.S. Pat. No. 2,654,706 discussed above. The caustic solution can be regenerated and mercaptans and disulfides can be converted to elemental sulfur, which can be recovered for its chemical value by filtration, and/or converted to an aqueous solution comprising sulfates, which are water soluble and can be disposed of without liability to the environment. In the electrochemical cell, excess oxygen is liberated in the anode compartment of the cell which results in the conversion by direct oxidation of mercaptans, disulfides, and sulfides present as impurities in the spent caustic solution to elemental sulfur and/or sulfates. Rather than vent the excess oxygen to the environment during processing, the excess oxygen can be passed to a column for pre-treatment of the spent caustic solution feedstream. The use of a cationic permselective membrane as a cell separator in the electrolysis cell utilized in the process allows the formation of a pure sodium hydroxide solution in the cathode compartment of the cell with the feeding of deionized water to the cathode compartment. A porous membrane cell separator can be used where recovery of a pure sodium hydroxide solution is not required. Accordingly, by use of the process, it is possible to reduce the purchase of caustic in an amount equivalent to the amount of the sulfur compounds scrubbed from the hydrocarbon process streams and discharged as sulfates. The process is applicable in one embodiment to destroy or to convert to a benign, environmentally non-toxic state, the sulfur-containing compounds or other organic ingredients removed by caustic scrubbing of a hydrocarbon process stream such as those streams from olefin plants, ethane and propane crackers, as well as sour gasoline process streams.

It is therefore an object of the present invention to provide a process and apparatus for treating sulfur-containing spent caustic solutions from refinery operations that produces an environmentally acceptable effluent that can be discharged into the sea or into a conventional sewage treatment system.

Another object of the invention is to provide such a process that is efficient, that requires a minimal capital investment for installation, and has low operating costs.

It is a further object of the invention to provide a process in which the chloride ion present in seawater is converted to a hypochlorite that is reactive with the sulfur-containing species as part of the reaction scheme.

SUMMARY OF THE INVENTION

The above objects and further advantages are provided by the method and process of the invention to treat by oxidizing and neutralizing refinery and gas plant spent caustic streams containing sulfur using a membrane electrolyzer to generate hypochlorous acid and fresh sodium hydroxide, the hypochlorous acid stream being added to the spent caustic and passed through a static mixer-reactor filled with catalyst to promote the reaction of the hypochlorous acid with sulfur species, including sulfide ions, polysulfides, mercaptans, thioethers, dialkyl disulfides, and other organics and sulfur compounds, thereby causing their oxidation. The hypochlorous acid also reacts to neutralize the sodium hydroxide. The resulting reaction is odorless and produces a neutral aqueous solution of sodium sulfate, sodium carbonate and sodium chloride that can be safely discharged to conventional sewage treatment plants and/or into the open sea.

An additional product stream from the electrolyzer is a fresh caustic solution at a 15% concentration by weight that is suitable for use in the refinery or gas plant to replace the spent caustic.

An additional product of the electrolysis process is pure hydrogen gas that is preferably directed to the inlet of a proton exchange membrane (PEM) fuel cell to produce DC electric power to supplement the power requirements of the electrolyzer.

An additional product of the fuel cell is pure water that can be directed to the electrolyzer cathode compartment to receive the sodium ions passing through the membrane.

The process of the invention provides a simple, inexpensive and effective solution to meet the ever-growing waste disposal problems associated with sweetening hydrocarbon fluids. The process converts spent caustic to a neutral, odorless, harmless, and non-toxic aqueous solution of sodium chloride, sodium sulfate and sodium carbonate, having a composition comparable to that of seawater and acceptable for direct discharge to surface waters. The process can be operated with a relatively low capital investment in a robust, automatic dependable process with regenerable agent, valuable by-products, and at almost a zero or negative operating cost.

The invention can be utilized in all refineries and gas plants that utilize caustic to provide for the safe, environmentally acceptable, cost-effective, dependable disposal of spent caustic.

BRIEF DESCRIPTION OF THE DRAWINGS

The invention will be described in further detail below and with reference to the attached drawings in which the same and similar elements are identified by like numerals, and where.

DETAILED DESCRIPTION OF THE PREFERRED EMBODIMENTS

Figure 1:
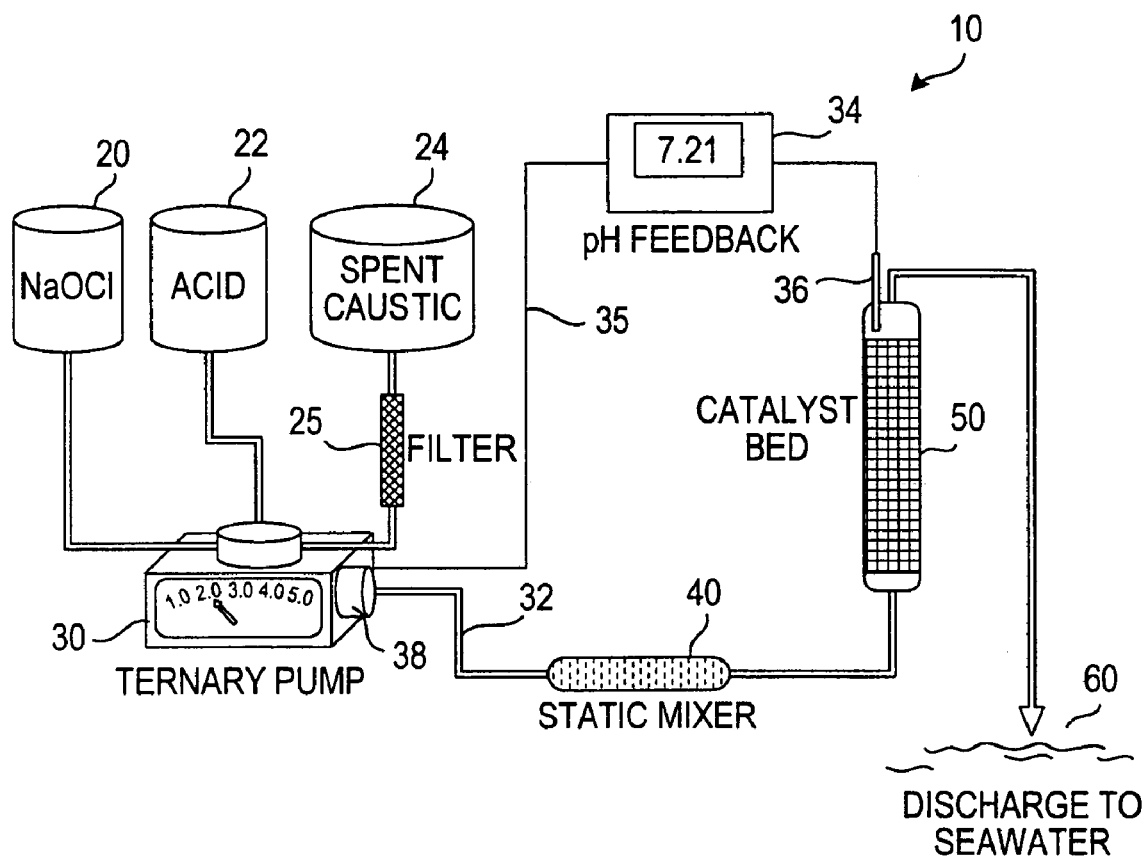
FIG. 1 is a schematic illustration for the continuous practice of one preferred embodiment of the process.

This invention broadly comprehends producing a sodium hydroxide solution and a hypochlorous acid solution by an electrochemical process from aqueous brine, using the hypochlorous acid stream to treat, that is, to oxidize and neutralize a sulfur-containing alkaline waste stream which results from scrubbing a hydrocarbon liquid or gas stream to remove its sulfur compounds. The oxidation and neutralization treatment is promoted by one or more supported, slurried or dissolved catalysts in a reaction zone and preferably during a mixing step which advantageously employs an on-line static mixer.

Pure sodium hydroxide in a 15% aqueous solution that is produced by the electrolysis is used to replace the spent caustic that is being treated. Hydrogen generated at the cathode as a product of the electrolysis is routed to a proton exchange membrane fuel cell that produces a DC electric current, which current is used to supplement the electric current used to carry out the electrolysis.

The following series of examples illustrate the practice of the invention in a batch fashion utilizing commonly available industrial acids in the neutralization step.

Example 1

Hydrochloric Acid

To a 500 ml beaker provided with a stirring bar was added 50 ml of spent caustic solution and placed on a stirring plate. A combined probe and pH electrode was placed in the solution. The pH was measured at 11.65 against pH 7.00 and pH 4.00 reference buffers. To the caustic was added 200 ml of 5.25% sodium hypochlorite solution and 50 mg $FeSO_4$, then stirred for 5 minutes, as the pH rose to 12.50 and the solution turned light blue due to presence of cobalt phthalocyanine Merox catalyst. Thereafter, 33 ml of 10 M concentrated hydrochloric acid (HCl) was slowly added to a pH of 7.00. During addition of the HCl, the solution turned greenish with copious foaming and evolution of green gas (chlorine). The final pH was 6.65 and the solution was brownish with iron precipitate, with no odor except a faint chlorine odor. The resulting neutral solution was stirred for 15 minutes. The product was analyzed by ion chromatography for anions of chloride, sulfide, mercaptide, sulfate, sulfite, carbonate, bisulfide, bisulfate, bisulfite, thiosulfate bicarbonate and hydroxide. The chromatograms were compared to the original spent caustic chromatograms. The resulting solution of nearly 200 ml was pH neutral and odorless.

Example 2

Sulfuric Acid

A 500 ml beaker provided with a stirring bar was placed on a stirring plate, 50 ml of spent caustic solution was added and a combined probe and pH electrode was placed in the solution. The pH was measured at 11.65 against pH 7.00 and pH 4.00 reference buffers. To the caustic was added 200 ml of 5.25% sodium hypochlorite solution and 50 mg $FeSO_4$ and stirred for 5 minutes, as the pH rose to 12.32 and the solution turned light blue due to the presence of cobalt phthalocyanine Merox catalyst. The 10 M concentrated sulfuric acid was slowly added to a pH 7.00. During addition of 10 ml of concentrated $H_2SO_4$ the solution turned greenish with copious foaming and evolution of green gas (chlorine). The final pH was 6.07 and the solution was brownish with iron precipitate, with only a faint chlorine odor. The resulting neutral solution was stirred for 15 minutes. The product was then analyzed by ion chromatography for anions of chloride, sulfide, mercaptide, sulfate, sulfite, carbonate, bisulfide, bisulfate, bisulfite, thiosulfate bicarbonate and hydroxide. The chromatograms were compared to the original spent caustic chromatograms. The resulting solution of nearly 200 ml was pH neutral and odorless.

Example 3

Nitric Acid

A 500 ml beaker provided with a stirring bar was placed on a stirring plate, 50 ml of spent caustic was added and a combined probe pH and electrode was placed in the solution. The pH was measured at 11.65 vs reference buffers of pH 7.00 and pH 4.00. To the caustic was added 200 ml of 5.25% sodium hypochlorite solution and 50 mg $FeSO_4$ and stirred for 5 minutes, as the pH rose to 12.43 and solution turned light blue due to presence of cobalt phthalocyanine Merox catalyst. The 11 M concentrated nitric acid was slowly added to a pH 7.00. During addition of 19 ml of concentrated $HNO_3$, the solution turned greenish with copious foaming and evolution of green gas (chlorine). The final pH was 6.65 and the solution was brownish with iron precipitate, with only a faint chlorine odor. The resulting neutral solution was stirred for 15 minutes. The product was then analyzed by ion chromatography for anions of chloride, sulfide, mercaptide, sulfate, sulfite, carbonate, bisulfide, bisulfate, bisulfite, thiosulfate bicarbonate and hydroxide. The chromatograms were compared to the original spent caustic chromatograms. The resulting solution of nearly 200 ml was pH neutral and odorless.

In the above examples, the preferred catalysts were selected from nickel, iron and molybdenum oxides on a high-resistance calcium aluminate cement. Catalysts containing cobalt and transition metal oxides can also be employed. Other high resistance catalyst supports can include aluminas, silicas, refractories, cements, concretes and composites. The selection of the catalyst components and appropriate supports and substrates is well within the ordinary skill of the art.

The use of two particularly preferred catalysts are described in examples illustrating the process of the invention. The first, is a commercial nickel-molybdenum catalyst that was developed for pretreating hydrocracker feedstreams. The catalyst consists of 20-30% by weight of nickel and molybdenum oxides loaded onto a support consisting of mesoporous gamma alumina, $Al_2O_3$.

The second of the preferred catalysts is a hydrotreating catalyst developed for use in producing middle distillates and consists of from 30-35% by weight of cobalt and molybdenum oxide on mesoporous gamma alumina. The catalyst is available in the form of spheres 2.5 mm in diameter having a bulk density of 0.65 kg/liter. In the sulfided form, this catalyst is active for hydrotreating and desulfurization, but in the oxide form it is active in promoting oxidation reactions.

Suitable commercial hydrotreating catalysts are available from Akzo Nobel as cobalt-molybdenum oxide on gamma alumina and from Süd Chemie as nickel-molybdenum oxide on gamma alumina. A commercial methanation catalyst is available from Unicat as nickle oxide on calcium aluminate cement for promoting the oxidation of sulfur species by hypochlorite. It has been found that the calcium aluminate cement supported catalysts held up well to the extreme environment, while other hydrotreating catalysts tended to be physically unstable and to fragment upon exposure to caustic and hypochlorite for extended periods.

The preferred nickel oxide or molybdenum oxide catalyst supported on a calcium-aluminate cement can be fabricated by mixing the nickel or molybdenum oxide with a commercial calcium aluminate cement formulation such as that sold under the trademark FOSROC by its manufacturer Fosam Corp. Typical ratios of 10-20% metal oxide with 80-90% cement are slurried with the prescribed amount of distilled water, allowed to firm up and then extruded or formed into spheres.

Calcium aluminates (CAC) are also known as aluminous cement or high alumina cement (HAC). Calcium aluminate cements were originally formulated to provide sulphate resistant cements.

There are three principal types of calcium aluminates, and calcium mono-aluminate (CA) cements are preferred. The hydration of calcium mono-aluminate contributes to the early strength of the CAC. The molybdenum or nickel oxides supported on calcium aluminate cements are highly resistant to hydrolysis and oxidation when exposed to the strong alkaline streams which also contain hypochlorite ions.

The following commercial catalysts can also be used in the practice of the invention:

1. The Haldor-Topsoe methanation catalyst PK-7R is an extruded ring with OD×ID of 5×2.5 mm that contains NiO 32% on an alumina support that has a useful operating temperature range of 190-450° C.

2. Unicat ISM active ceramic spherical support media series are impregnated, all-purpose support materials for use in refineries, chemical and gas plants and provides active ceramic support. It is available in a wide variety of sizes and in the form of spheres and in tubular shapes. Important characteristics for these class of products are a uniform spherical shape that provides high stress distribution and a high crush strength. Composition ranges are: CoO 1-2% or NiO 1-2%, $MoO_3$ 5-6%, $SiO_2$ 55%, $Al_2O_3$ 25-35%, $TiO_2$ 0-2% max, $Fe_2O_3$ 0-2% max, CaO 0.3-0.5% $K_2O$ 1-3%, sulfur 20-30 ppm, and Cl 1-5 ppm. The bulk density can range from 81-90 lbs/cu.ft., depending on size. The preferred size is ⅛ inch spheres. The crush strength is >400-1800 lbs., based on size correlation surface area: 0.02-0.03 $M_2$/g; apparent porosity >0.80-0.9; and acid resistance is >98%

3. Unicat catalyst MC-710 is a Ni-based methanation catalyst that is available in the oxidized version. It is spherical with 18-25% NiO, high activity, high surface area, and has a preferred operating temperature range from 450° to 800° F. and the optimum operating temperature is from 500° to 700° F. It is alkaline and hydrolysis resistant and is supported on a calcium aluminate cement. The bulk density is 0.8-1.0 kg/liter size and shape: 3-6 mm sphere radial crush strength: 13.5 lbs.; spherical surface area: 80-120 m2/g. The attrition loss is less than 3% for spherical shapes.

4. KATALCO 11-4 methanation catalyst consists of nickel oxide and promoters combined on a calcium aluminate cement support. A cylindrical extrudate has a diameter of 5.4 mm, a length of 3.6 mm, with a typical nickel content of NiO 35%. The charged bulk density is 1.23 kg/l. The product has a mean axial crush strength of 130 kgf.

The following information is provided based on currently available contact information concerning the corporate identity and locations of catalyst suppliers. There have been some recent changes as a result of mergers/acquisitions. Website addresses are also provided as a potentially more stable source of information for sources of these products, regardless of any future corporate ownership and hierarchial changes that may occur.

Johnson Matthey, Inc., located in West Deptford, N.J. 08066 sells the KATALCO® catalyst products; (catinquiries@jmusa.com).

Unicat Catalyst Technologies, Inc., located in Alvin, Tex. 77511 sells a wide variety of catalysts including those used in steam reforming; (unicatme@earthlink.net)

Akzo-Nobel Catalysts was acquired by Albemarle corporation of Amersfoort, The Netherlands, having a local company, Albemarle Catalysts Coompany LP in Houston, Tex. 77058; (catalyst.us@albemarle.com)

Sud-Chemie AG is an international marketer located in Munich, Germany 80333; Sud-Chemie Inc. has an office in Louisville, Ky. 40232 (sud-chemie.com).

Fosroc, PLC is also an international marketer located in Tarnworth, Staffordshire, B78 3TL, United Kingdom; (info@fosroc.com).

Haldor Topsoe, Inc. is a subsidiary of a Danish company, with local offices in Houston, Tex. 77058; (haldortopsoe.com).

The process of the invention is a combination of acid neutralization and sulfur oxidation, and both of these reactions are mildly exothermic. The net process, even with dilution effects, is consequently exothermic and there is an expected 20-30° C. exotherm over the course of the treatment. A scaled-up version of the process may require cooling coils depending on the design of the reactor and flow rates. Spent caustic is typically stored in tanks at ambient temperatures which means that the feedstock ranges in temperature from 15° C. to 45° C. The process preferably starts with spent caustic at a moderate temperature from the storage tank that can require pre-heating or cooling to reach a preferred 25° C. inlet temperature to the process, with the maximum temperature of the reactor outlet controlled so as not to exceed about 65° C.

The static mixer is preferrably positioned upstream of the catalyst bed. Suitable static mixers are well known and commercially available from numerous manufacturers. They are also available as dual-purpose devices with heat exchanger and mixing functions combined in one unit for controlling inlet temperatures and mixing.

In the event that seawater is utilized in the process, the hypochlorous acid from the electrolyzer will include other components present in seawater, unless it is pretreated to remove hardness or scale-forming components. Some electrolyzer manufacturers recommend a pretreatment of the seawater to prevent corrosion and scale. This can be accomplished using well known ion exchange or water softener technology that removes calcium and magnesium and replaces them with sodium. Synthetic brine or seawater can also be produced by dissolving pure sodium chloride in distilled water, but this is a more expensive alternative to the use of seawater. Preferably, an ion exchange unit is used to eliminate hardness from the brine feed stream to the electrolyzer.

The composition of seawater is detailed in Table I. Typically, seawater at 3.5% salinity includes the following major elements as measured in parts per million (ppm):

TABLE I

| Element | PPM |
| --- | --- |
| Bromine | 67.3 |
| Potassium | 392 |
| Calcium | 411 |

TABLE I-continued

| Element | PPM |
| --- | --- |
| Sulfur | 904 |
| Magnesium | 1,290 |
| Sodium | 10,800 |
| Chlorine | 19,400 |

Membrane electrolyzers are standard components in the chemical and waste treatment industries. All the world's caustic and chlorine are made with an electrolyzer of the membrane type. Membranes are either porous ceramic or porous polymers with ion exchange capability. They are commercially available from numerous suppliers. Polymer membranes are more useful for electrolytes that contain sludge or solids. Ceramic membranes are more stable and durable. The ceramic membrane is preferred for use in the present invention.

Treatment of napthenates, phenolates and carboxylates with the hypochlorous acid generated by the electrolyzer, or by sodium hypochlorite, in the presence of oxidation catalyst, will result in the destruction of most of these organic anions, converting them to carbon dioxide. These reactions are very well known and understood by environmental chemists, and are one reason chlorine is commonly used in wastewater treatment. To the extent that these napthenates, phenolates and carboxylates are not destroyed, they are at such low levels of concentration that they will not pose an environmental concern, especially when diluted by seawater. The primary environmental concerns in the disposal of spent refining caustic is first, its high alkalinity, and second, the odiferous sulfur components.

The power requirement for operation of the membrane electrolyzer along with the percentage of that requirement supplied by the PEM fuel cell can be estimated in accordance with the following analysis.

A typical refinery with combined gas plant will produce 100 gallons per hour of spent caustic from operations including desalting, neutralization, steam generation, ion exchange, scrubbing and other processes. This caustic will contain approximately 7% NaOH, 2% $NaCO_3$, 1% $NaHCO_3$, 2% $Na_2S$ and NaHS, 2% combined total of oxidized sulfur compounds: e.g., $NaHSO_3$, $Na_2SO_3$, $Na_2SO_4$, $NaHSO_4$, $Na_2S_2O_3$, and sodium napthenates, phenolates, and carboxylates. Total sulfur will be on the order of 2-3%, with about 1% sulfur as sulfide, which must be oxidized. The calculated value is 0.3277 moles/second.

In the electrolyzer, seawater or other brine solution is converted to hypochlorous and hydrochloric acid at the anode and sodium hydroxide and hydrogen at the cathode. In this process, 2 electrons are required to produce each molecule of hypochlorous acid. The net cell reaction and cell voltage amounts to E=−2.32 Volts.

Sulfide reacts with two moles of hypochlorous acid to produce sulfur dioxide, which further reacts with oxygen and sodium hydroxide to produce sodium sulfate. In this process, 6 equivalents of sodium hydroxide are neutralized.

One Farad of electricity is required to generate one equivalent of electricity, and a Farad is 96500 ampere-seconds. Treatment of one sulfide molecule requires 2 molecules of hypochlorous acid, and this requires 4 electrons to be produced by electrolysis. To treat 0.3277 moles of sulfide per second then requires 126522 amperes.

Although this current flow is large, it is only required at a voltage of 2.5 volts. The power requirement is then only 316 kw. The efficiency of the electrolysis is about 85%, due to over-voltage and thermal losses, boosting the requirement by 22% to 372 kw.

The purpose of the PEM fuel cell is to provide supplemental power to the electrical generator or electrical grid that supplies the power to the electrolyzer. In the preferred embodiment of the invention, the produced hydrogen is used to generate supplemental power to the electrolyzer. The amount of power generated depends on the efficiency of the electrolysis process and the overall efficiency of the PEM fuel cell, which is in the range of 40%-60% efficient. Hydrogen generated as a by-product of the electrolysis at the cathode is routed to a PEM fuel cell, which produces a DC electric current, that preferably is used to supplement the electric current used to carry out the electrolysis.

If the hydrogen is not used in the fuel cell to supplement the electric current used to carry out the electrolysis, it can be recovered and used in other refinery processes, such as hydrotreating or hydrocracking although the amount of hydrogen produced would not typically be sufficient for continuous operation of a commercial-scale process unit. Optionally, the hydrogen can be collected for other off-site applications, including fuel cells for power generation or for use in pilot plant operations. This aspect of the invention represents a significant advantage in he efficiency of the overall process as compared to typical prior art where hydrogen generated from electrolysis units is diluted and discharged into the air, thus simply being wasted.

The pH of the product discharges can be adjusted to pH 7.0 by optimizing the ratio of caustic to hypochlorous acid or by optimizing the reaction conditions. A precise control of the pumps is required in scaled-up operations of the process. In a preferred embodiment, feedback control from the pH measurements is provided either to permit an operator to make the adjustments, or for entry into a programmed microprocessor that automatically makes the adjustments using digital valve controllers.

Additional electrical power is consumed by the process to supply pumps, valves, control equipment and monitors. Operational power, together with electrolysis power requirements total about 400 kw. This is a fairly modest energy requirement, equal to the output of two large diesel generators, 4 automobile engines, or the power requirement of 10 average homes. As fuel cells are near 60% efficient at operating temperatures of 100° C., the fuel cell can supply about 60% of this energy by converting hydrogen from the process into electricity, given the 85% efficiency of the electrolysis, the 60% efficiency of the fuel cell, and other power consumed by the process. The power draw from the grid required to supplement the process is then about 150 kw.

In the following examples, the continuous practice of the process of the invention is described utilizing laboratory scale apparatus.

Example 4

Referring to the schematic diagram of FIG. 1, there is illustrated one embodiment 10 for the continuous practice of the process of the invention. In this example, 4.00 M hydrochloric acid, 0.89 M sodium hypochlorite and spent caustic with a total of strong and weak alkalinity of 1.60 equivalents per liter, were provided in separate storage containers 20, 22 and 24, respectively, as feeds to a ternary pump 30 and associated pumping system 32. The caustic feed to the pump 30, preferably passes through a filter 25. The pumping system includes a pH meter 34 with probe 36 and a pH feedback loop 35 that directs a signal to a programmed pump controller 38. When the pH value varies beyond a predetermined upper or lower limit, the controller 38 varies the rate of the quantitative feed from one or more of the storage containers 20, 22 and 24 until the pH of the treated discharge is back in the desired range.

The pump was primed and set at a flow rate of 10.0 ml/minute. The stream composition was set at 30% NaOCl (0.89 N), 20% HCl (4.0 N), and 50% spent caustic (3.1 N). This mixture was passed through in-line static mixer 40 downstream of the catalyst. The catalyst bed 50 was a 10-inch by one-inch inside diameter tube filled with nickel oxide and molybdenum oxide cylindrical extrudate. The treated product discharge stream 60 had a pH of 7.

The dark green, corrosive, foul smelling spent caustic was converted by the reagents and catalyst bed in accordance with the invention to a clear, yellow, odorless, neutral solution having a composition similar to seawater, and which exhibited a zero chemical and biological oxygen demand.

Example 5

In another example using the same set-up illustrated in FIG. 1, the catalyst bed 10 inches by one inch in diameter was filled with cobalt oxide and molybdenum oxide spheres. The stream composition was introduced at 44% NaOCl (0.89 N), 16% HCl (4.0 N), and 40% spent caustic (3.1 N). The reaction product 60 was discharged at pH 6.5. The dark green, corrosive, foul smelling spent caustic was converted by the reagents and catalyst bed to a clear, greenish-yellow, odorless, neutral solution 60 having a composition similar to seawater, with a zero chemical and biological oxygen demand.

Example 6

Another preferred embodiment of the invention will be described with reference to FIG. 2 in the context of a schematic illustration of a commercial-scale facility. The principal components of the apparatus include an AC-DC converter 110, a fuel cell 120, an electrolyzer 130, and a catalyst static mixer-reactor 150. The process employs a membrane electrolyzer to generate hypochlorous acid and fresh sodium hydroxide. The hypochlorous acid is mixed with spent caustic and the mixture is passed through a static mixer-reactor filled with catalyst.

An additional product derived from the electrolyzer is a fresh caustic solution prepared at a 15% concentration that is suitable for use in a refinery or gas plant to replace the spent caustic. An additional product of the electrolysis process is pure hydrogen gas, which was directed to the inlet of a proton exchange membrane fuel cell, which produced DC electric power used to supplement the requirements of the electrolyzer. An additional product of the fuel cell is pure water, which is used in the electrolyzer cathode compartment to receive the sodium ions passing through the membrane. The preferred catalyst is a nickel oxide-molybdenum oxide supported on alumina in a cylindrical or spherical extrudate.

Figure 2:
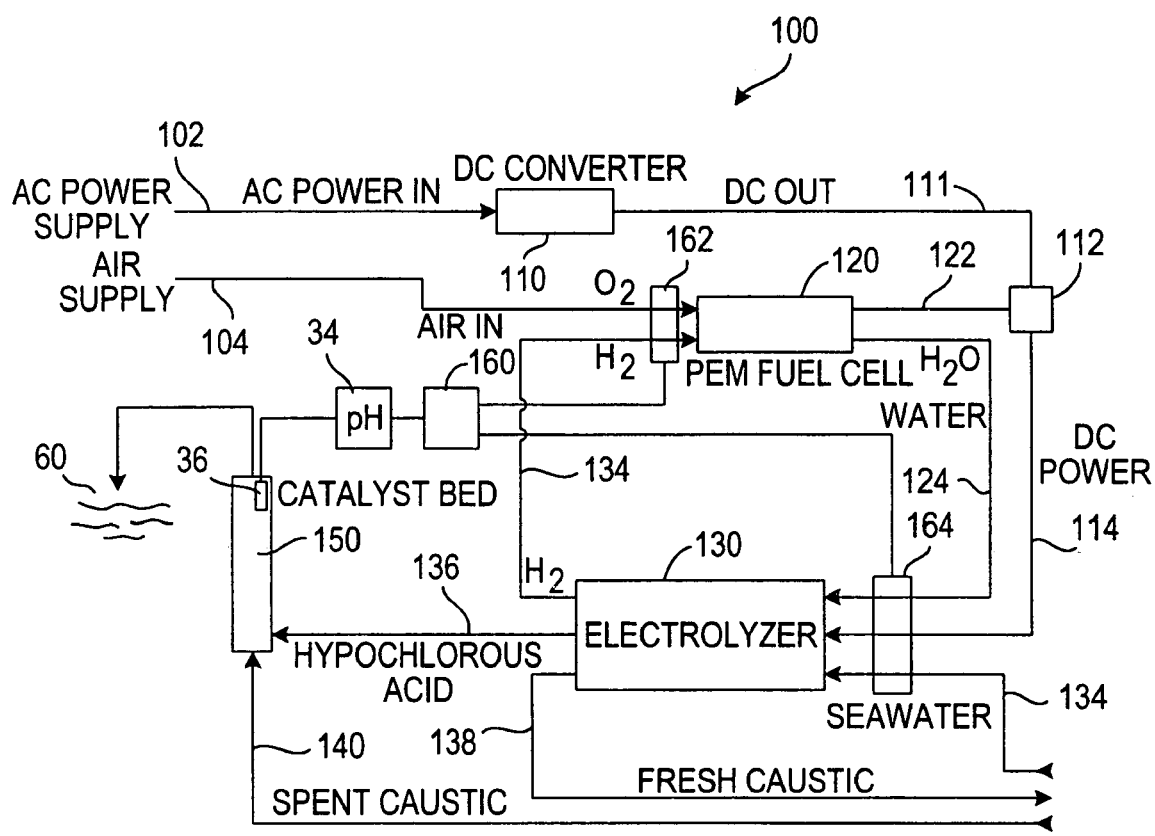
FIG. 2 is a schematic illustration of another preferred embodiment of a continuous process in accordance with the invention.

A detailed description of the arrangement of the apparatus continues with reference to FIG. 2 where electrolyzer 130 is supplied by a source of brine 134, which is preferably seawater. Primary power for the system 100 is provided by an AC power supply 102 that is converted by DC converter 110 with DC output 111, that is fed through junction device 112 to electrolyzer supply line 114.

Electrolyzer 130 produces a supply of hypochlorous acid that is discharged as feedstream 136 to static mixer 40. A spent caustic feedstream 140 enters static mixer 40 for mixing before being introduced into catalyst bed 50.

With continuing reference to FIG. 2, the hydrogen stream 134 discharged from electrolyzer 130 is fed as fuel to the PEM fuel cell 120, along with an oxidant feedstream 104, which in this embodiment is atmospheric air. The DC electrical power generated by fuel cell 120 is fed via line 122 to junction device 112 to provide at least a portion of the power requirements of electrolyzer 130. Junction device 112 can also include protective elements, such as diodes, to isolate the fuel cell 120 and the electrolyzer 130 from surges.

Water generated by the fuel cell 120 is discharged at 124 and fed to the electrolyzer to generate fresh caustic 138 from the sodium and hydroxyl ions created.

The downstream or discharge end of the catalyst bed 50 is fitted with a probe 36 from electronic pH analyzer and feedback device 34. Signals from the pH analyzer 34 are fed to programmed processor/controller 160 that is used to control fluid flows through precision meter valve blocks 162 associated with the fuel cell 120, and 164 at the electrolyzer 130. As in the system described above in Example 4, when the pH detected at probe 36 varies from the predetermined range, controller 160 adjusts the flow rates of the fluid feedstreams, and if necessary, the electrical power, in order to bring the system back into the desired pH value operating range.

In a particularly preferred embodiment, the spent caustic is maintained in a large storage vessel from which feed 140 is drawn. The chemical composition, i.e. hydroxyl ion content, and pH of the stored caustic is monitored and the data fed to the programmed processor/controller 160 at predetermined intervals, including specifically, when the pH value changes. The processor/controller calculates the fluid flow of hypochlorous acid 136 required to neutralize the spent caustic being delivered at the optimum flow rates to keep the system operating within prescribed environmentally acceptable limits.

The hypochlorous acid reacts with sulfur species including sulfide ion, polysulfides, mercaptans, thioethers, dialkyl disulfides, and other organics and sulfur compounds over a nickel oxide-molybdenum oxide catalyst bed, causing their oxidation to sulfates. The hypochlorous and hydrochloric acid present in the electrolyte also reacts with sodium hydroxide to neutralize it. The net effect of these reactions is to form an odorless, neutral aqueous solution of sodium sulfate, sodium carbonate and sodium chloride that is very similar in composition to seawater. This treated, neutral, odor-free product with no chemical and biological oxygen demand can be safely discharged to sewage treatment plants and the open sea.

As demonstrated above, the process of the invention produces an environmentally harmless, neutral, non-toxic aqueous stream similar in composition to seawater, at a very low initial capital cost when compared to the processes of the prior art. As a further advantage, the process has no significant operating expenses.

As will be apparent to one of ordinary skill in the art, the above examples can be readily scaled-up to provide pilot plant and commercial scale operations.

While the preferred and alternative embodiments have been set forth in detail, and illustrated by examples, it should be understood that the invention is not limited to the details of construction and the arrangements of the components set forth in the description or illustrated in the drawings. As will also be apparent to those of ordinary skill in the art, the invention is capable of other embodiments and of being practiced and carried out in various ways. It should also be understood that the phraseology and terminology employed herein are for the purposes of description and should not be regarded as limiting, and that the full scope of the invention is to be determined with reference to the claims that follow.

We claim:

1. A continuous method for the treatment of a spent aqueous caustic stream used to scrub a hydrocarbon process stream to remove sulfur-containing compounds, the spent caustic stream including oxidizable sulfur-containing compounds and sodium hydroxide, the method comprising the steps of:
   a. providing a first oxidizing treatment stream comprising hypochlorous acid produced from an aqueous brine solution;
   b. mixing the hypochlorous acid stream with the aqueous caustic stream to form a reactive mixed feedstream;
   c. contacting the reactive mixed feedstream with at least one catalyst to promote the oxidation of the sulfur-containing compounds and the neutralization of the sodium hydroxide;
   d. recovering a neutral treated product stream comprising aqueous sodium sulfate, sodium carbonate and sodium chloride, whereby said treated product stream is odorless, non-toxic and environmentally acceptable for discharge into the sea or into a conventional sewage treatment system.

2. The method of claim 1, wherein the hypochlorous acid is produced by introducing the brine solution into an electrolyzer.

3. The method of claim 2, wherein the electrolyzer is a membrane electrolyzer.

4. The method of claim 3 which includes the further step of filtering the seawater to remove solids.

5. The method of claim 3 which includes the further step of recovering a hydrogen gas stream from the electrolyzer.

6. The method of claim 5 which includes the further step of utilizing the hydrogen gas as a process feedstream to a fuel cell or hydrotreating refinery process.

7. The method of claim 2, wherein the brine solution is seawater.

8. The method of claim 1, wherein the sodium hydroxide content of the spent caustic stream is about 7%.

9. The method of claim 1, wherein the oxidizable sulfur content of the spent caustic stream is from 0.1% to 10%.

10. The method of claim 1, wherein the spent caustic stream contains sulfur compounds selected from the group consisting of $Na_2S$, $NaHS$, $NaHSO_3$, $Na_2SO_3$, $Na_2SO_4$ $NaHSO_4$ and $Na_2S_2O_3$.

11. The method of claim 1, wherein the hypochlorous acid treatment stream is discharged from the outlet of a membrane electrolyzer that is in fluid communication with the caustic stream.

12. The method of claim 11, wherein the brine solution is seawater.

13. The method of claim 11, wherein the membrane electrolyzer also discharges a fresh aqueous stream of sodium hydroxide and the method includes the further step of directing the fresh sodium hydroxide stream into contact with the hydrocarbon process stream to remove sulfur-containing compounds and thereby becomes part of the spent caustic stream.

14. The method of claim 11, wherein the hypochlorous acid stream includes hydrochloric acid.

15. The method of claim 14, wherein the hypochlorous acid stream includes equal molar quantities of hypochlorous acid and hydrochloric acid.

16. The method of claim 11, wherein the membrane electrolyzer is operated at a voltage differential of 2.5±0.5 volts.

17. The method of claim 11, wherein the membrane electrolyzer produces a hydrogen gas stream, and the method comprises the further steps of:
  delivering the hydrogen gas stream to the inlet of a proton exchange membrane fuel cell to generate a DC electrical current; and
  delivering the DC electrical current to the electrolyzer,
  whereby at least a portion of the overall power requirements of the treatment method are provided by the fuel cell.

18. The method of claim 17, wherein the fuel cell produces a product stream of water and the method comprises the further step of:
  delivering the stream of water to the cathodic cell of the electrolyzer,
  whereby the operation of the fuel cell provides water to form the fresh aqueous sodium hydroxide stream produced by the electrolyzer.

19. The method of claim 18 which is continuous.

20. The method of claim 1 in which the catalyst of step (c) is selected from the group consisting of nickel, iron and molybdenum oxides, and oxides of transition metals impregnated on high-resistance calcium aluminate cements, aluminas, silicas, refractory materials, concretes and composites.

21. The method of claim 1, wherein the reactive mixed feedstream passes through a static mixer.

22. The method of claim 1 which includes the further steps of monitoring the pH value of the treated product stream and controlling the flow rate of the hypochlorous acid stream or the spent caustic stream, or both streams, in order to maintain the pH value of the treated product in the range of 6.5 to 7.5.

23. The method of claim 22, wherein the pH value is monitored downstream of the reaction zone.

24. An electrochemical process for the treatment of an aqueous spent caustic solution that comprises sodium hydroxide and oxidizable sulfur-containing compounds, said spent caustic obtained from treating a sulfur-containing hydrocarbon fluid stream with a fresh stream of caustic solution containing sodium hydroxide, the process comprising:
  a. providing a membrane electrolyzer having an anodic cell and a cathodic cell;
  b. providing a proton exchange membrane (PEM) fuel cell having a hydrogen inlet and a water outlet, said fuel cell being electrically connected to said electrolyzer;
  c. introducing an aqueous brine solution into the electrolyzer to generate separate streams of fresh sodium hydroxide and hypochlorous acid;
  d. mixing the hypochlorous acid stream with the aqueous caustic stream to form a reactive mixed feedstream;
  e. contacting the reactive mixed feedstream with a catalyst in a reaction zone to promote the oxidation of the sulfur-containing compounds and the neutralization of the sodium hydroxide;
  f. discharging a neutral treated product stream from the reaction zone, the treated product stream comprising aqueous sodium sulfate, sodium carbonate and sodium chloride in the form of a non-toxic, odorless and environmentally acceptable solution;
  g. recovering a stream of hydrogen gas from the electrolyzer as a by-product of the step (c);
  h. directing the stream of hydrogen gas to the fuel cell to generate a DC electrical current and delivering the current to the electrolyzer;
  i. recovering a stream of pure water from the outlet of the fuel cell and directing the water stream to the cathodic cell of the electrolyzer to provide a fresh sodium hydroxide solution at a concentration of 15%; and
  j. recovering the fresh sodium hydroxide solution from the electrolyzer to replenish the fresh stream of caustic for use in treating the sulfur-containing hydrocarbon fluid stream.

25. The method of claim 24 which is continuous.

26. The method of claim 24 which includes the further step of pretreating the brine solution to remove calcium and magnesium that is present in the brine.

27. The method of claim 26, wherein the pretreatment utilizes an ion exchange process to substitute sodium for the calcium and magnesium.

* * * * *

UNITED STATES PATENT AND TRADEMARK OFFICE
CERTIFICATE OF CORRECTION

| | | |
|---|---|---|
| PATENT NO. | : 7,713,399 B2 | Page 1 of 1 |
| APPLICATION NO. | : 11/128857 | |
| DATED | : May 11, 2010 | |
| INVENTOR(S) | : Martinie et al. | |

It is certified that error appears in the above-identified patent and that said Letters Patent is hereby corrected as shown below:

Title page,
in item (75), "Fahran" should be changed to -- Farhan --.

Signed and Sealed this

Second Day of November, 2010

David J. Kappos
*Director of the United States Patent and Trademark Office*